*Churn.*
N° 78,791.   Patented Jan. 9, 1868.
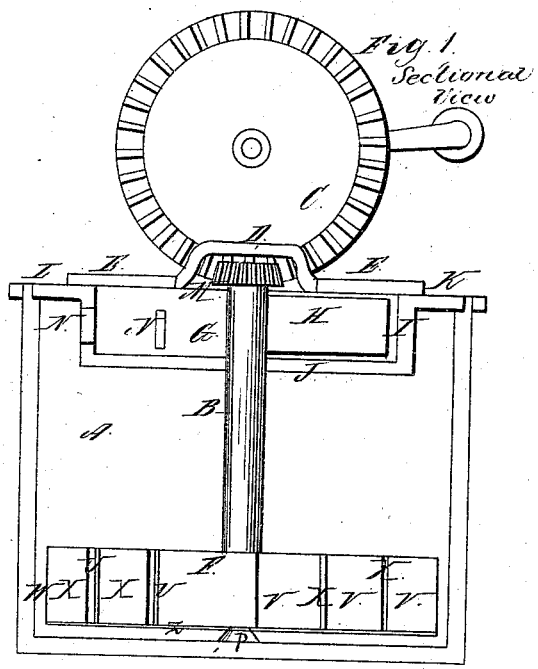
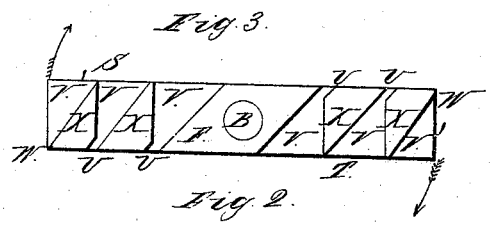
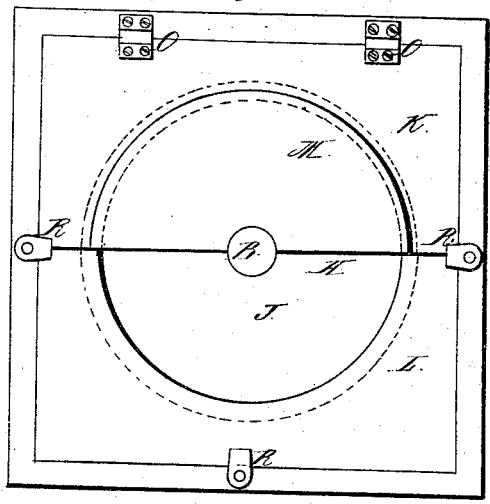
Witnesses:
G. L. Chapin
A. Hayward
Inventor:
Samuel T. Curtiss

United States Patent Office.

SAMUEL T. CURTISS, OF EL PASO, ILLINOIS, ASSIGNOR TO HIMSELF AND LYMAN P. THOMPKINS, OF SAME PLACE.

Letters Patent No. 78,791, dated June 9, 1868.

IMPROVEMENT IN CHURNS.

*The Schedule referred to in these Letters Patent and making part of the same.*

TO ALL WHOM IT MAY CONCERN:

Be it known that I, SAMUEL T. CURTISS, of El Paso, in the county of Woodford, in the State of Illinois, have invented a useful Improvement in Churns; and I do hereby declare that the following is a full and exact description thereof, reference being had to the accompanying drawings, and to the letters of reference marked thereon, making a part of this specification, in which—

Figure 1 is a sectional elevation of my invention.

Figure 2, a plan view of the same with the gearing removed.

Figure 3, a plan view of the dash removed from the other parts of the churn.

The nature of my invention consists in a peculiar dasher, having angular vertical projections, arranged to receive a large quantity of cream at their faces and sides, and by the motion of the dasher force it through small openings, whereby a great amount of friction is obtained with but little motion.

In order to give a correct understanding of my invention, I have marked corresponding parts with similar letters, and will now give a detailed description.

A represents a common box-churn for holding the cream, arranged similar to those now in use, and therefore needs no particular description.

K L represent a two-part lid, made of wood or other suitable material, and to fit in a rabbet at the inside of the top of box A, in the usual manner, and with a drum, G I J, projecting downward, in which is made to operate a fan, H, rigidly attached to and driven by a vertical shaft, B.

In the manufacture of the lid and drum, I find it most convenient to make them both of a single piece of two-inch plank, turned out in a lathe before being cut through the centre, and afterward cut through its periphery such a number of holes, N N, as will allow the fan H to force such a quantity of air into the box A as will keep the cream therein cool, a semicircular plate, M, being secured to the half, K, of the lid, for the purpose of partially confining the air when being forced through the holes N.

The dasher has a peculiar construction, as follows:

A suitable piece of wood, F, figs. 1 and 2, is cut away at V V, &c., down to Z, so as to leave large spaces between the projections X F at the faces T S of the dasher, and small openings, U, at the back or opposite sides of the same, whereby cream may readily enter at V, and be forced out at U, and thus create such an amount of friction as is necessary to make butter speedily, a part of the wood being left at the bottom, as seen at Z, for supporting the projections X, and giving the dasher proper strength. The dasher is rigidly attached to the shaft B, which bears on a step, P, passes through the centre of the drum G I J, and is driven by means of cog-gearing C D, held in position by an iron frame, E, attached to that part of the lid shown at K, the arrangement of the gearing for driving the dasher being so simple as to be fully understood without further description.

The drum G I J and fan H do not perform a new function, as similar devices have been used before for a like purpose, and they have been described only to give a clear conception of the whole churn completed for use.

Having thus described my invention, I claim, and desire to secure by Letters Patent of the United States—

The dasher F, constructed and arranged to operate substantially as and for the purpose herein set forth.

SAMUEL T. CURTISS.

Witnesses:
G. L. CHAPIN,
A. HAYWARD.